(12) United States Patent
Heeringa

(10) Patent No.: US 9,155,150 B2
(45) Date of Patent: Oct. 6, 2015

(54) LED DRIVER OPERATING IN DIFFERENT MODES

(75) Inventor: Schelte Heeringa, Sneek (NL)

(73) Assignee: KONINKLIJKE PHILIPS N.V., Eindhoven (NL)

(*) Notice: Subject to any disclaimer, the term of this patent is extended or adjusted under 35 U.S.C. 154(b) by 0 days.

(21) Appl. No.: 14/343,566

(22) PCT Filed: Sep. 14, 2012

(86) PCT No.: PCT/IB2012/054791
§ 371 (c)(1),
(2), (4) Date: Mar. 7, 2014

(87) PCT Pub. No.: WO2013/042020
PCT Pub. Date: Mar. 28, 2013

(65) Prior Publication Data
US 2014/0217913 A1 Aug. 7, 2014

Related U.S. Application Data

(60) Provisional application No. 61/536,120, filed on Sep. 19, 2011.

(51) Int. Cl.
*H05B 37/02* (2006.01)
*H05B 33/08* (2006.01)

(52) U.S. Cl.
CPC .......... *H05B 33/0824* (2013.01); *H05B 33/083* (2013.01); *H05B 33/0815* (2013.01); *Y02B 20/347* (2013.01)

(58) Field of Classification Search
USPC ............. 315/185 R, 186, 193, 291, 299, 300, 315/302, 306, 360
See application file for complete search history.

(56) References Cited

U.S. PATENT DOCUMENTS

| | | | |
|---|---|---|---|
| 5,959,413 A * | 9/1999 | Komarek et al. | 315/306 |
| 8,410,717 B2 * | 4/2013 | Shteynberg et al. | 315/291 |
| 8,810,160 B2 * | 8/2014 | Hoogzaad et al. | 315/307 |
| 2009/0195180 A1 | 8/2009 | Chenetz | |
| 2011/0068713 A1 | 3/2011 | Hoogzaad | |
| 2011/0109247 A1 | 5/2011 | Hoogzaad | |

FOREIGN PATENT DOCUMENTS

| | | |
|---|---|---|
| WO | 2007141741 A1 | 12/2007 |
| WO | 2010128845 A1 | 11/2010 |
| WO | 2011039678 A1 | 4/2011 |

OTHER PUBLICATIONS

2MHz, High-Brightness LED Drivers with Integrated MOSFET and High-Side Current Sense, 2010.

* cited by examiner

*Primary Examiner* — Thuy Vinh Tran
(74) *Attorney, Agent, or Firm* — Yuliya Mathis

(57) ABSTRACT

A LED driver system (1) comprises a current source (4) which supplies a power supply current (i) to a parallel arrangement of a parallel switch (20) and a LED (10). The parallel switch (20) short-circuits the LED (10) when it is closed. A controller (15) generates during use: (i) a first control signal (E) to control the current source (4) to change from a regulating mode wherein the power supply (i) current is regulated to have a non-zero average level into a decaying mode wherein the power supply current (i) decays during a decay period (Td), and (ii) a second control signal (CSO) to control the parallel switch (20) to open during an open period (To) comprising a sub-period of the decay period (Td).

13 Claims, 3 Drawing Sheets

LED DRIVER OPERATING IN DIFFERENT MODES

CROSS-REFERENCE TO PRIOR APPLICATIONS

This application is the U.S. National Phase application under 35 U.S.C. §371 of International Application No. PCT/IB2012/054791, filed on Sep. 14, 2012, which claims the benefit of U.S. Provisional Patent Application No. 61/536,120, filed on Sep. 19, 2011. These applications are hereby incorporated by reference herein.

FIELD OF THE INVENTION

The invention relates to a LED (Light Emitting Diode) driver system, to a lamp comprising such a LED driver system and to method of driving a LED.

BACKGROUND OF THE INVENTION

WO 2010/128845 discloses a control unit for a LED assembly and a lighting system. A buck converter supplies a power supply current to a series arrangement of LED's. The LED's can be dimmed by switching on and off the buck converter with a particular power supply duty-cycle. Such a power supply duty-cycle dimming (also referred to as PWM control) is applied to all the LED's in the string and thus does not allow to dim the LED's individually. Alternatively, across each one of the LED's an associated LED switch is arranged. Now, the on and off times of the LED switches can be different for different LED's. When the LED switch is open, the current flows through the LED and when the LED switch is closed the current flows through the LED switch. The LED will be dimmed more if the LED switch closes during a longer percentage of the time. The LED switches are controlled by a microprocessor via associated level converters. In an embodiment, the dimming of the LED's is obtained by a combination of duty-cycle dimming of the LED switches and reducing the power supply current. In this approach, the power supply current supplied by the buck converter is stabilized on different levels such that together with the duty-cycle dimming of the LED switches more intensity steps can be generated.

SUMMARY OF THE INVENTION

It is an object of the invention to provide a LED driver system which enables smaller light intensity steps.

A first aspect of the invention provides a LED driver system as claimed and described herein. A second aspect of the invention provides a lamp as claimed and described herein. A third aspect of the invention provides a method of driving a LED as claimed and described herein. Advantageous embodiments are defined in the claims and the detailed description.

The LED driver system according to the invention comprises a current source which supplies a power supply current to a parallel arrangement of a parallel switch and a LED. The parallel switch is one of the LED switches of the prior art. Instead of a single LED with its associated parallel switch a string of LED's with their associated parallel switches may be used as disclosed in the prior art. The parallel switch short-circuits the LED when closed and thereby causes a substantially zero current through the LED.

A controller controls the parallel switch and the current source such that the current source is active and supplies a regulated average power supply current which is substantially constant during a period in time. This period in time is also referred to as the constant current period. The parallel switches may be PWM (pulse width modulated) controlled as is disclosed in the prior art. This prior art approach is implemented because the color and the light intensity of a (power) LED are only well defined in a specified single operating point wherein a particular forward current flows through the LED. Thus, if the LED color and light intensity are very important, the LED should be operated at exactly this current, and dimming should be performed by the PWM on/off modulation only. However, a LED driven by a constant current source and PWM modulated with a 16 bit PWM on/off signal has a dimming ratio of 65535:1. For a wake-up light, this dimming range is insufficient because the initial step from zero to 1/65535 is clearly visible and might negatively affect the wake-up light performance. During the constant current period, the level of the current supplied by the active current source may be modulated to have different constant levels.

In accordance with the present invention, the controller controls the current source to supply a decaying power supply current during a decay period in time following the constant current period. The controller controls the parallel switch to open during an open period which comprises a sub-period of the decay period. This approach enables to open the parallel switch during any period in time during the decay period wherein the current decays from its regulated (relatively high) value to a relatively low value, for example zero. Thus, in contrast with the prior art it is possible to provide a higher number of the light intensity levels by opening the parallel switch during the decay period. For the lowest light intensities, the parallel switch is only opened during the decay period and not anymore during the period wherein the current is regulated to have the desired constant level.

The power supply current starts decaying towards zero as soon as at the end of the constant current period the current source is deactivated or is actively regulated to supply a decaying power supply current. By opening the parallel switch during at least a sub period in time of the decay period it is possible to supply any current level between the maximum level occurring during the constant current period and zero. The number of current levels and thus intensity levels which can be obtained in this manner can easily be selected to be very high by an appropriate selection of the duration of the decay period and the time accuracy of the open period. This approach of opening the parallel switch during the decay period may be combined with the known PWM control wherein the parallel switch is opened with a desired duty-cycle during the constant current period.

The controller may be implemented in a single hardware device (usually an integrated circuit) or may be a functional block in a single hardware device, or may comprise one or more functional blocks in different hardware devices.

The same advantageous effects can be reached with a lamp which comprises the LED driver system controller and the LED's in an appropriate housing which fits the application of the lamp. Such a lamp may be used as a wake-up light, but may have any other use in which dimming with small intensity steps is desired. The LED driver system may comprise the controller, the current source and the LED.

In an embodiment, the decay period is defined to last from an instant the power supply current starts decaying until the power supply current reaches the zero level. If the duration of the open period is short, as is required for very low intensities, it is not possible to obtain different average current levels through the LED during the open period if this open period completely occurs when the power supply current has the zero level.

Alternative, for higher intensities, the decay period may include a period in time during which the power supply current has the zero level to change the average current through the LED with a duration of the open period covering the, or a portion of the, period in time the power supply current is zero.

In an embodiment, the controller controls the open period to be a sub-period of the decay period such that the open period completely occurs within the decay period. Again, for low intensities a smooth control of the dimming of the LED's is obtained by using an open period which is short with respect to the decay period. Such short periods have to occur during the decay period.

In an embodiment, the controller controls a time of occurrence of the open period within the decay period and/or a duration of the open period. During the decay period, the current through the LED can easily be controlled by adjusting the opening instant at which the parallel switch opens with respect to the start instant of the decay period. The number of current levels through the LED depends on the duration of the decay period and the maximum reachable accuracy of the open instant.

In an embodiment, in a dimming mode wherein the light intensity of the LED has to change, the controller repetitively performs the following actions. First, the current source is activated to supply the non-zero average power supply current during the constant current period. Next, the current source is deactivated to obtain the decaying power supply current and finally the parallel switch is opened during the open period which to allow a portion of the decaying current to flow through the LED. As discussed before, the moment of occurrence of the open period and/or its duration are controlled to vary the average current through the LED. If the variation of the intensity of the LED has to occur at very low intensities, the open period has a very short duration within the decay period. For higher light intensities, the parallel switch may also be open during the constant current period. Dependent on the implementation of the current source, the power supply current occurring during the constant current period may have a ripple. What counts is that the average level of the power supply current is stabilized on a non-zero level. The level of the power supply current during different constant current periods may be identical or may be different. The level of the power supply current during a particular constant current period may have different non zero levels.

In an embodiment, the controller comprises a clock generator which supplies a clock signal with a clock period to a clocked circuit. The clocked circuit shifts a time of occurrence of the open period in consecutive decay periods with an integer multiple of the clock period to obtain a changing intensity of light generated by the LED in the consecutive decay periods. For example, the lowest light intensity will be reached by switching off the parallel switch during one clock period just before the power supply current in the decay period reaches zero. The one but lowest intensity will be obtained by switching off the parallel switch during one clock period one clock period earlier. More than one open period may occur during a single decay period. For low intensities both open periods will have a small duration, for example, each one may last one clock period.

In an embodiment, the clocked circuit controls the duration of the open period to be an integer multiple of the clock period. Depending on the actual light intensity and the desired change of the intensity, the duration of the open period may be controlled to change the average level of the current through the LED. Dependent on the shape of the decaying power supply current during the decay period, this may be relevant for very low intensities where the average power supply current over two (or more consecutive clock periods) is smaller than the average power supply current over 1 earlier clock period. This control of the duration of the open period may be combined with the control of the instant of occurrence of the open period.

In an embodiment, the current source comprises a switch mode power supply (SMPS). Such a SMPS comprises an inductor which supplies the power supply current to the parallel arrangement of the parallel switch and the LED. The duration of the decay period can easily be influenced by selecting an appropriate value of the inductance of the inductor. Now, the control signal to the current source is a simple enable/disable signal. The SMPS is activated (or enabled) in the regulation mode during the constant current period and is deactivated (or disabled) during the decay period. It has to be noted that is not essential to the invention to use a switch mode power supply and its inductor. The power supply current source may be any current source with a decay period which is relatively long with respect to the actual clock period. The current source may be controlled to have a particular desired decay of its current during the decay period.

In an embodiment, the switch mode power supply comprises a switch mode switch and a freewheel diode. A series arrangement of the inductor and the switch mode switch are coupled to a power supply voltage source via the LED. A series arrangement of the diode and the switch mode switch are also coupled to the power supply voltage. The diode is poled to convey the power supply current flowing through the inductor when the switch mode switch is open.

In an embodiment, a further parallel switch is arranged in parallel with a further LED. The further parallel switch is arranged in series with the series arrangement of the first mentioned parallel switch and the current source. The controller further controls the further switch to open during a further open period which is a further sub-period of the decay period. The string of series arranged LED's may comprise more than two LED's. A further parallel switch is arranged in parallel with the (or each if more than two) further LED. The controller changes the intensity of light produced by each of the additional LED's in the same manner as discussed herein before. The intensity produced by different LED's may be different and/or may be varied differently during the dimming process. The present invention enables to vary the intensity of each one of the LED's with very small steps. The magnitude of the steps depends on the ratio of the accuracy in time with which the instant of the open period can be controlled and the duration of the decay period. These and other aspects of the invention are apparent from and will be elucidated with reference to the embodiments described hereinafter.

It should be noted that items which have the same reference numbers in different Figures, have the same structural features and the same functions, or are the same signals. Where the function and/or structure of such an item has been explained, there is no necessity for repeated explanation thereof in the detailed description.

DETAILED DESCRIPTION

Figure 1:
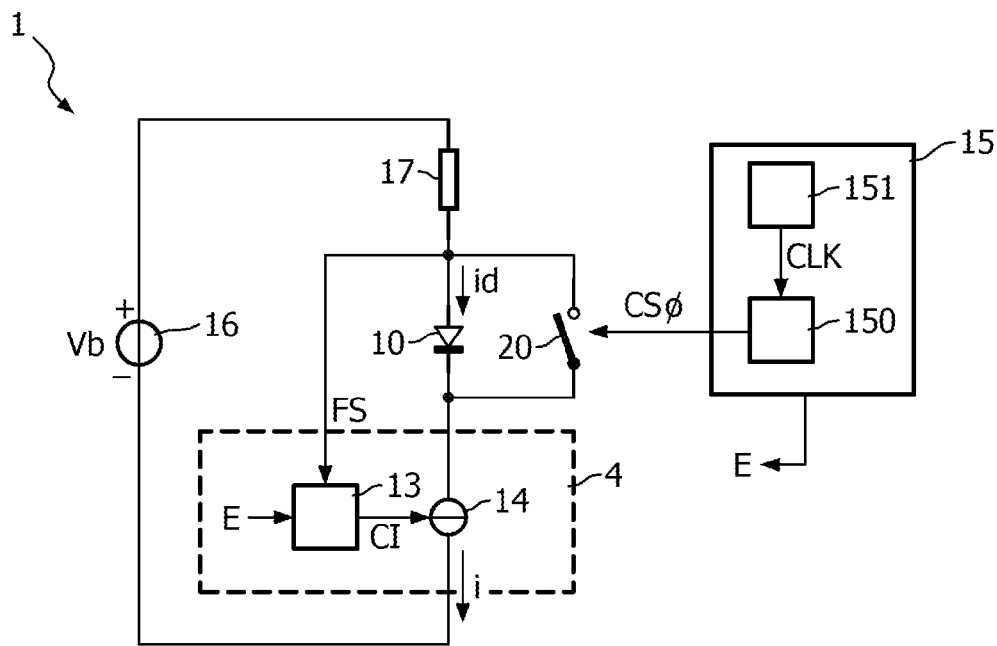
FIG. 1 schematically shows a lamp 1 including a LED 10 and a driver circuit.

FIG. 1 schematically shows a lamp 1 including a LED 10 and a controller 15. The voltage source 16 supplies a power supply voltage Vb to a series arrangement of a sensing resistor 17, the LED 10 and the current source 4. The current source 4 comprises the current generator 14 and a controller 13. The controller 13 receives an enable signal E and a feedback signal FS to supply a control signal CI to the current generator 14. The enable signal E is used to activate the current source 4 during the constant current period Ta (see FIG. 2B). When the enable signal E activates the current source 4 it is regulated to supply the non-zero average power supply current i. The controller 13 uses the feedback signal FS, which is a measure for the current i flowing through the resistor 17, to keep the current i constant at the desired non-zero average level. When the enable signal deactivates the current source 4, either the current source 4 is switched off or the current generator 14 is regulated to supply a decaying current i. The period in time wherein the current i decays is referred to as the decay period. It should be noted that such a controllable current source 4 can be configured in numerous ways. In an embodiment, the current generator is a semiconductor current source which supplies a power supply current i in accordance with the control signal CI. In another embodiment, the controller 13 and the current generator 14 are part of a SMPS. Now, the current generator 14 is an inductor and the control signal CI is a switch signal applied to the inductor by a controlled switch. An example of such an SMPS implementation is shown in FIG. 3.

A parallel switch 20 is arranged in parallel with the LED 10. The controller 15 controls the state of the parallel switch 20. If the parallel switch 20 is closed, the current i flows through the parallel switch 20 and the current id through the LED 10 is substantially zero. If the parallel switch 20 is open, the current I flows through the LED 10 and the current through the parallel switch 20 is substantially zero. It is known that the controller 15 controls the parallel switch 20 in PWM (pulse width mode) during the constant current period. Thus, in the prior art the parallel switch 20 is only opened during the (or a sub-period) of the constant current period. With constant is meant that in the prior art the average value of the current i is kept constant during an open period of the parallel switch 20. If a ripple is present around this average value (which usually is the case if a SMPS 4 is used as the current source), the minimum value of the power supply current i is not zero and the ripple is relatively small with respect to the average value. This prior art PWM control of the parallel switch 20 varies the duration during which the constant current flows through the LED 10 to control the intensity of the light emitted by the LED 10. The control of the intensity of the LED 10 is generally referred to as dimming the LED 10. Thus, dimming may mean that the light intensity of the LED decreases or increases. In an embodiment, the controller 15 comprises a clock generating circuit 151 which generates a clock signal CLK with a clock period Tclk and a clocked circuit 150 which supplies the control signal CS0 to the parallel switch 20 to control its state. The operation of the present invention will be elucidated in detail with respect to FIGS. 2A to 2D.

Figure 2A:
FIGS. 2A to 2D show simplified waveforms for elucidating the operation of the lamp 1 shown in FIG. 1, FIG. 3 schematically shows a lamp 1 with a string of three LED's.
Figure 2B:
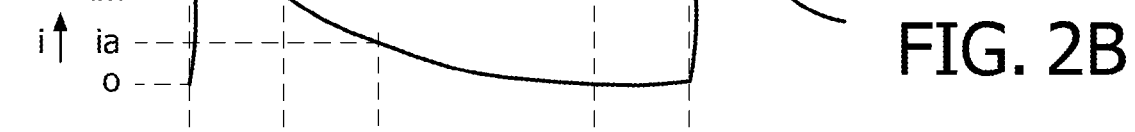
Figure 2C:
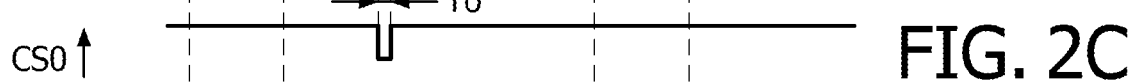
Figure 2D:
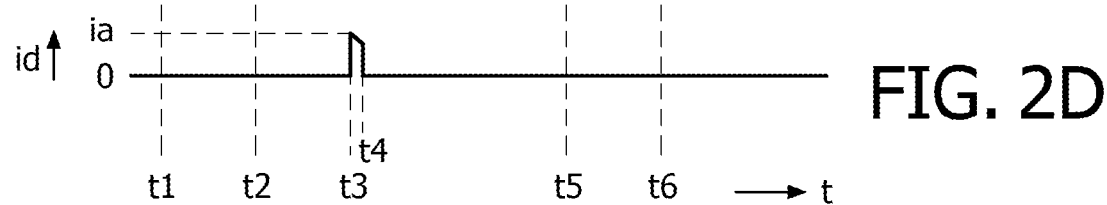
Figure 3:
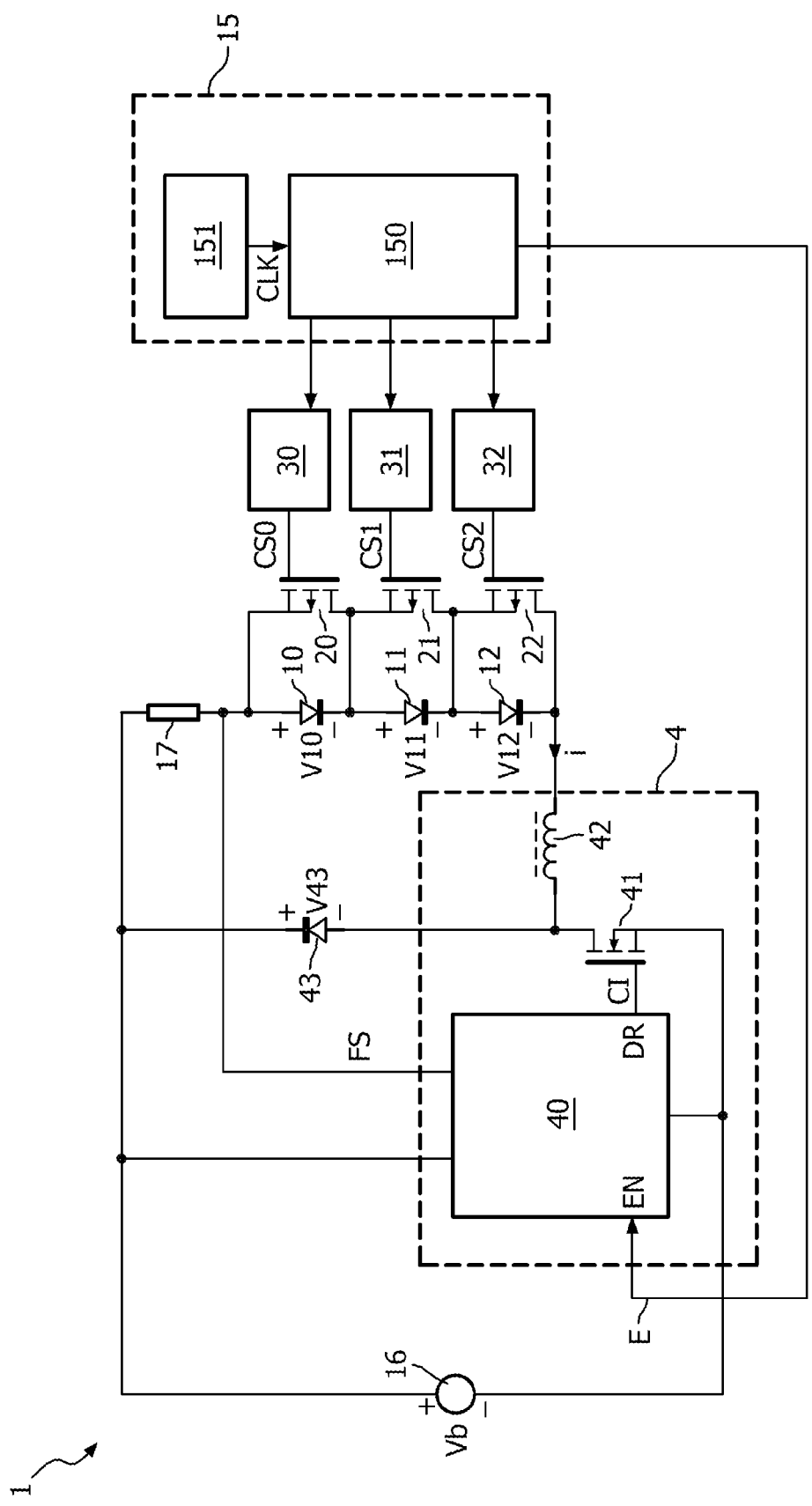

FIGS. 2A to 2D show simplified waveforms for elucidating the operation of the lamp 1 shown in FIG. 1. FIG. 2A shows the enable signal E as a function of time. A low level indicates that the current source 4 is not in the constant current period; a high level indicates the constant current period during which the current source 4 is active to supply the regulated power supply current i which has the desired level. FIG. 2B shows the power supply current i supplied by the current source 4 to the parallel arranged parallel switch 20 and LED 10. FIG. 2C shows the control signal CS0. A low level indicates that the switch 2 is closed; a high level indicates that the switch 2 is open. FIG. 2D shows the current id through the LED 10.

At the instant t1 the enable signal E changes from low to high level and the current source 14 is activated into the regulating mode. Within a very short time the current i increases to its regulated level im and keeps this level until the enable signal E drops to its low level at instant t2. Dependent on the implementation, a ripple (not shown) on the current i may occur. In FIGS. 2C and 2D it is shown that the switch 20 is closed during the active period Ta lasting from instant t1 to t2. Alternatively, the switch 20 may be PWM controlled during the active period Ta, as is well known from the prior art.

At the instant t2, the current source 4 is deactivated or controlled to supply a decaying power supply current i and the current i starts to decrease until it becomes zero at the instant t5. In this example, the decay period Td lasts from the instant t2 to the instant t5. Alternatively, the decay period Td may last from the instant t2 to the instant t6. At the instant t6 a next cycle starts by again activating the current source 4. The shape of the power supply current i during the decay period and the speed with which the power supply current i decreases depends on the implementation. In a SMPS at least one inductor is present which will cause a relatively slow decrease of the current. In other implementations, the current generator 14 may be controlled during the decay period Td to supply a decaying power supply current i with a desired decay speed.

At the instant t3, the control signal CS0 changes to the low level and the parallel switch 20 opens. Now, the current id through the LED 10 has the level ia. At the instant t4 the control signal CS0 changes into the high level and the parallel switch 20 closes. Now, the current id through the LED has the level zero again. The duration of the open period in time To during which the control signal CS0 has the low level and the current id through the LED 10 has a non-zero level may be controllable. The minimal intensity is obtained if the duration of the open period To is minimal. In a clocked system, this minimal duration of the open period To is one clock period. The number of extra intensity levels depends on the duration of the decay period Td and the time resolution of the starting instant t3. In a clocked system the starting instant can be selected to be an integer times a clock period after the instant t2 at which the decay period Td starts.

FIG. 3 schematically shows a lamp 1 with a string of three LED's. In contrast to FIG. 1 which shows the general idea of the present invention, FIG. 3 shows a particular implementation with an SMPS as the current source 4.

The lamp 1 shown in FIG. 3 comprises a string of 3 LED's 10, 11, 12 which are arranged in series with the sense impedance 17, the inductor 42 and the switch 41. This complete series arrangement is connected to a voltage source 16 which supplies the power supply voltage Vb. The inductor 42 and the switch 41 are part of the SMPS. The sense impedance 17 is used to obtain a feedback signal FS which is a measure of the current flowing through the inductor 42. The number of LED's in the string may be lower or higher than 3. The SMPS further comprises a controller 40 which receives the feedback signal FS, an enable signal E at an enable input EN and which supplies a control signal CI at the output DR to the control input of the SMPS switch 41.

Parallel switches 20, 21, 22 are arranged in parallel with the LED's 10, 11, 12, respectively. A controller 15 supplies control signals CS0, CS1, CS2 to the control inputs of the parallel switches 20, 21, 22, respectively, via level shifters 30, 31, 32, respectively. The controller 15 may be a clocked system with a clock generator 151 which generates a clock signal CLK. A clocked circuit 150 receives the clock signal CLK and supplies the control signals CS0, CS1, CS2 via the level shifters 30, 31, 32. The clocked circuit 150 may be a microprocessor. The voltages across the parallel arrangements of the LED's 10 to 12 and the parallel switches 20 to 22 are denoted with V10 to V12, respectively.

A diode 43 is arranged between the junction of the switch 41 and the inductor 42 on the one hand and the junction of the power supply voltage source 16 and the impedance 17 on the other hand. The diode is poled to conduct the current through the inductor 42 when the SMPS switch 41 is open (non-conductive). The voltage across the diode is denoted with V43. The operation of this lamp 1 is elucidated with respect to FIGS. 4A to 4C.

Although two separate controllers, one controller 40 for the SMPS and one controller 15 for controlling the parallel switches 20 to 22 are shown, this functionality may be combined in a single controller. Alternatively, more than the two controllers shown may be present, or the functions may be divided differently. For example, a third controller may be present to synchronously or asynchronously control the enable input EN. Anyhow, how the controlling function of the present invention is divided over the implemented hardware controller(s) is not important.

Figure 4A:
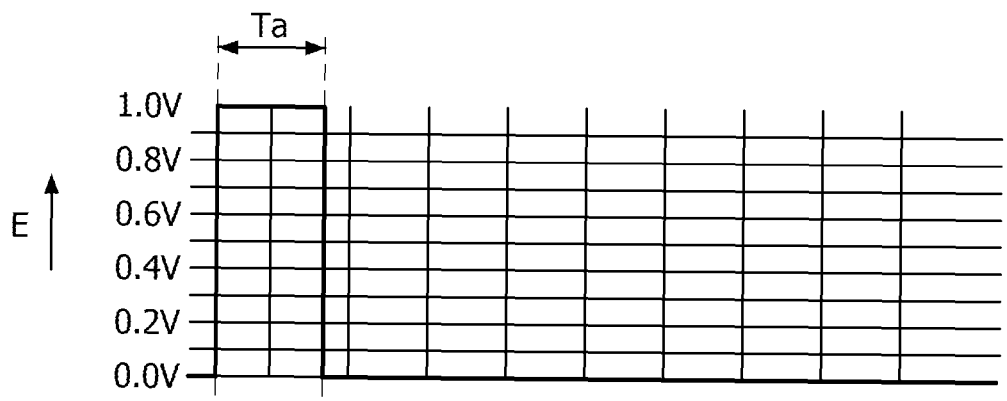
FIGS. 4A to 4C show waveforms of signals in the lamp of FIG. 3 for a particular embodiment of the invention.
Figure 4B:
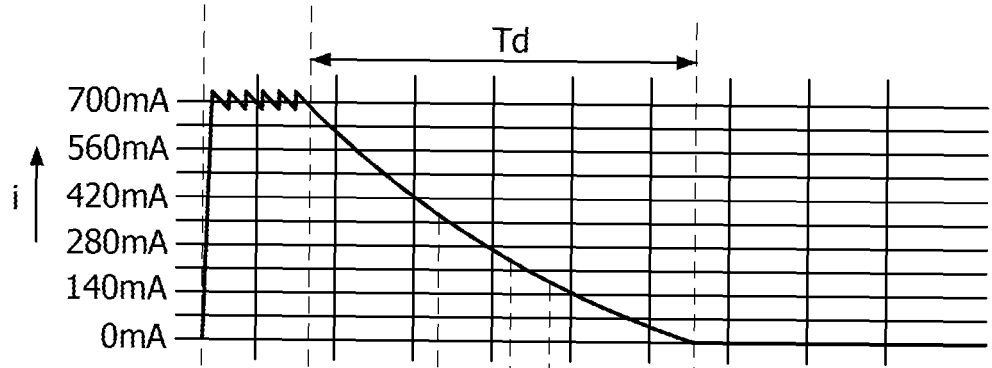
Figure 4C:
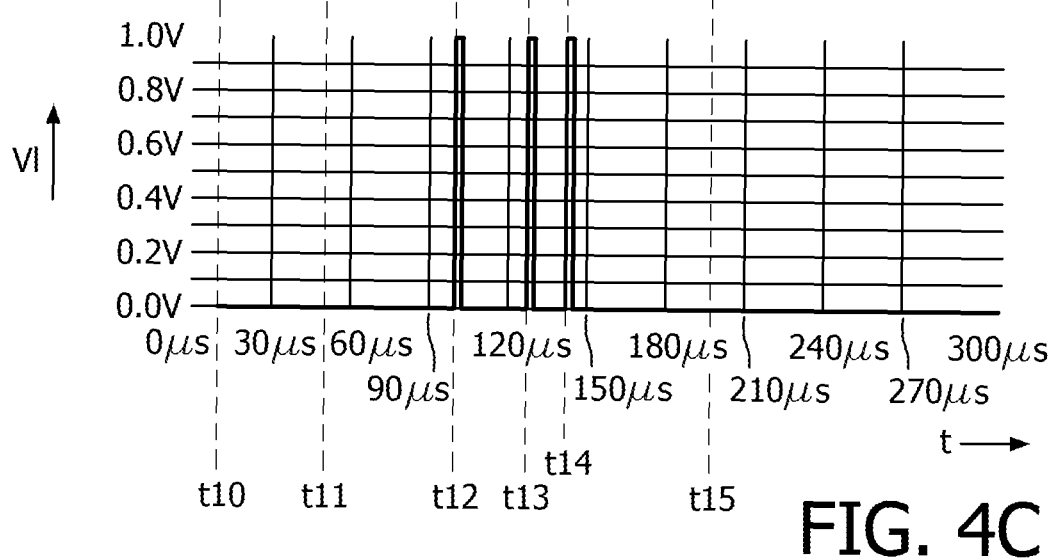

FIGS. 4A to 4C show waveforms of signals in the lamp of FIG. 3 for a particular embodiment of the invention. In this particular embodiment, with respect to FIG. 2A, the repetition time between to trailing edges of the enable signal E is about 10 ms. The inductance L of the inductor 42 in FIG. 3 is: L=100 µH, Vb=24 V, and im=735 mA.

At the instant t10 the enable signal E changes from its low level to the high level and the SMPS is activated. The current i through the inductor 42 rises in the very short time period of (im*L)/Vb=3 µs to its maximum level im. Between the instants t10 and t11 the controller 40 keeps the current i constant at 0.7±0.35 A by means of a known hysteretic control. At the instant t11 the enable signal E changes to its low level and the SMPS is disabled. The controller 40 stops the periodically switching on and off of the SMPS switch 41 and the current i through the inductor 42, the diode 43 and the parallel arrangement of the LED's 10 to 12 and the parallel switches 20 to 22 starts decaying. At the instant t11, each one of the parallel switches 20 to 22 is closed (conductive) and a substantially zero current flows through the LED's 10 to 12. Between the instants t11 and t15, the current i through the inductor 42 decays according to the equation:

$$i=(V43/Rs)*(e^{-t/\tau s}-1)+im*e^{-t/\tau s}$$

Wherein:
Rs=the resistance of the switches 20 to 22, the resistance of the impedance 17 and the diode 43.
τS=the secondary time constant defined by the inductance of the inductor 42 and Rs.
V43=the forward voltage of the diode 43.
If the diode 43 is a schottky diode, the switches 20 to 22 are mosfets, and the impendence 17 is a resistor, by way of example and in this particular embodiment only, Rs=0.83Ω, τs=120 µs, V43=0.3V and im=0.7 A, resulting in a decay time Td of 145 µs.

At the instant t12 the parallel switch 20 is opened for a very short time instance, for example during one clock cycle and at an instant with respect to the instant t11 defined by one of the available 65535 possibilities in a 16 bit control system. The current through the LED 19 during the open time of the parallel switch 20 may have any value between im and zero dependent on the occurrence of the instant t12 between the instants t11 and t15. In this example, if the clock CLK has a frequency of 20 MHz and a duration of the clock period is 50 ns, the current i can be set in 145 µs/50 ns=2900 steps corresponding to 0.24 mA each. With this time resolution, light intensity steps can no longer be observed. In the example shown, the current i at the instant t12 is 350 mA. Again, in this particular example, at t13 switch 22 is opened and the current i=210 mA flows through the LED 12 during one clock period. At t14 the switch 21 is opened and the current I=165 mA flows through the LED 11. The current i through the LED's may flow during a higher number of clock cycles than one. One or more of the instants t12 to t14 may coincide.

In this embodiment, the parallel switches 20 to 22 associated with the LED's 10 to 12, respectively are controlled such that current flows through all the LED's during the instants t12 to t14, respectively, all in the same decay period Td.

Alternatively, only a subset of the switches 20 to 22 may be opened during a same one of the decay periods Td. In another embodiment, the open periods To of the switches may occur in successive decay periods one by one or in sub-groups.

To resume, an embodiment of the present invention is directed to shunt all the LED's 10 to 12 with the parallel switches 20 to 22, than disable the SMPS 4 and finally applying a PWM pulse CS0 to CS2 to at least one of the parallel switches 20 to 22 to generate a current i through the associated LED 10 to 12 during the decay period Td wherein the current i through the inductor 43 decays to its zero value. An example of an SMPS 4 which can be enabled and disabled (at the DIM input) is known from the MAXIM data sheet of the integrated circuit MAX16832A/MAX16832C with title "2 MHz, High-Brightness LED Drivers with Integrated MOSFET and High-Side Current Sense" of Maxim Integrated Products, Sunnyvale Calif., USA.

The present invention may be used in wake-up lights, or more general in all lighting applications wherein the dimming range should be extended such that no visible light steps can be observed.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. An LED driver system for controlling at least one LED comprising:
   a current source for supplying a power supply current to a parallel arrangement of a parallel switch and the at least one LED,
   the parallel switch for short-circuiting the at least one LED when the parallel switch is closed,
   a controller configured for generating during use:
   a first control signal to control the current source to change from a regulating mode wherein the power supply current is regulated to have a non-zero average level into a decaying mode wherein the power supply current decays during a decay period, and a second control signal to control the parallel switch to open during an open period comprising a sub-period of the decay period.

2. The LED driver system as claimed in claim 1, wherein, in use, the decay period (Td) lasts from an instant the power supply current starts decaying until the power supply current is zero.

3. The LED driver system as claimed in claim 1, wherein the controller is configured for controlling the open period to be a sub-period of the decay period.

4. The LED driver system as claimed in claim 3, wherein the controller is configured for controlling a time of occurrence of the open period within the decay period and/or a duration of the open period.

5. The LED driver system as claimed in claim 1, configured for, when in a dimming mode, in the order mentioned, repetitively controlling the current source:
   to supply the non-zero average level power supply current,
   to obtain the decaying power supply current during the decay period and controlling the parallel switch to open during the open period.

6. The LED driver system as claimed in claim 5, wherein the controller comprises a clock generator for supplying a clock signal with a clock period to a clocked circuit, wherein the clocked circuit is configured for shifting a start instant of the open period in consecutive decay periods with an integer multiple of the clock period to obtain a change in intensity of light generated by the LED in consecutive decay periods.

7. The LED driver system as claimed in claim 6, wherein the clocked circuit is configured for controlling the open period (To) to have a duration being an integer multiple (N2) of the clock period (Tclk).

8. The LED driver system as claimed in claim 1, wherein the current source comprises a switch mode power supply comprising an inductor for supplying the power supply current (i) to the parallel arrangement of the parallel switch and the at least one LED.

9. The LED driver system as claimed in claim 8, wherein the switch mode power supply comprises a switch mode switch and a freewheel diode, wherein a series arrangement of the inductor and the switch mode switch are coupled to a power supply voltage source via the LED, and wherein a series arrangement of the diode and the switch mode switch are coupled to the power supply voltage and wherein the diode is poled to convey the power supply current (i) flowing through the inductor when the switch mode switch is open.

10. The LED driver system as claimed in claim 1, comprising a further parallel switch for being arranged in parallel with a second LED, the further parallel switch being arranged in series with the series arrangement of the first mentioned parallel switch and the current source, wherein the controller is further configured for controlling the further switch to open during a further open period being a further sub-period of the decay period (Td).

11. A lamp comprising the LED driver system as claimed in claim 1, and a plurality of LEDs arranged in series.

12. A lamp comprising the LED driver system as claimed in claim 1 and the at least one LED arranged in a housing.

13. A method of driving at least one LED in a system wherein:
   the at least one LED and a current source are arranged in series, and a parallel switch is arranged in parallel with the at least one LED for short-circuiting the at least one LED when the parallel switch is closed, the method comprising:
   controlling the current source to change from a regulating mode wherein the power supply current is regulated to have a non-zero average level into a decaying mode wherein the power supply current decays during a decay period, and
   controlling the parallel switch to open during an open period comprising a sub-period of the decay period.

\* \* \* \* \*